June 1, 1971  D. P. SMITH  3,581,339
POULTRY SHACKLE
Filed Oct. 20, 1967  4 Sheets-Sheet 1
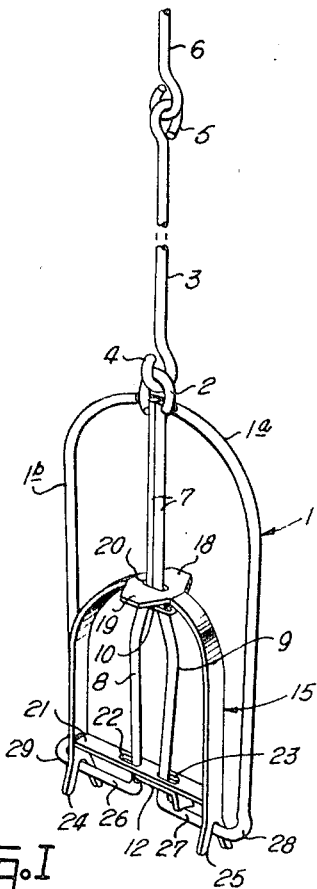
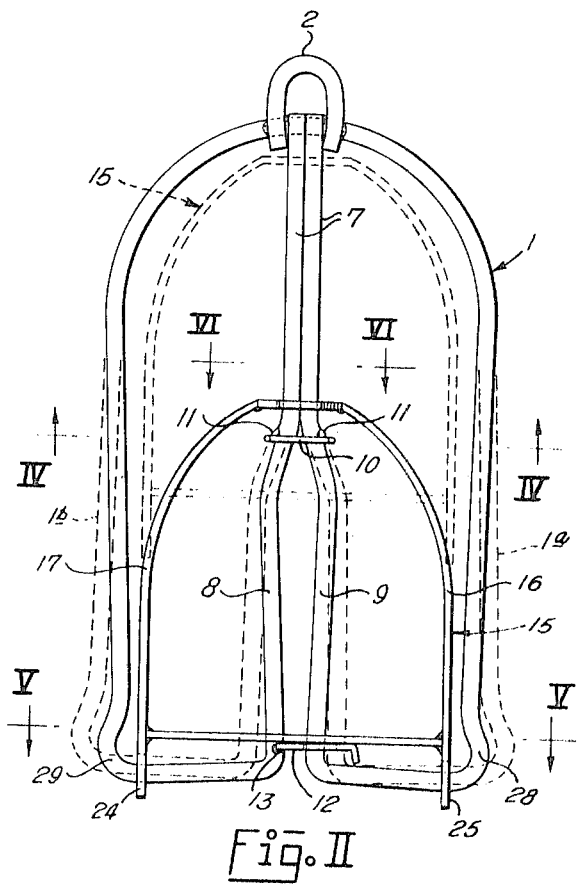
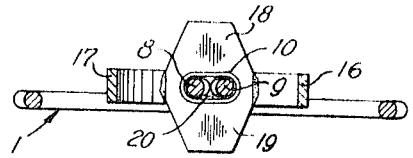
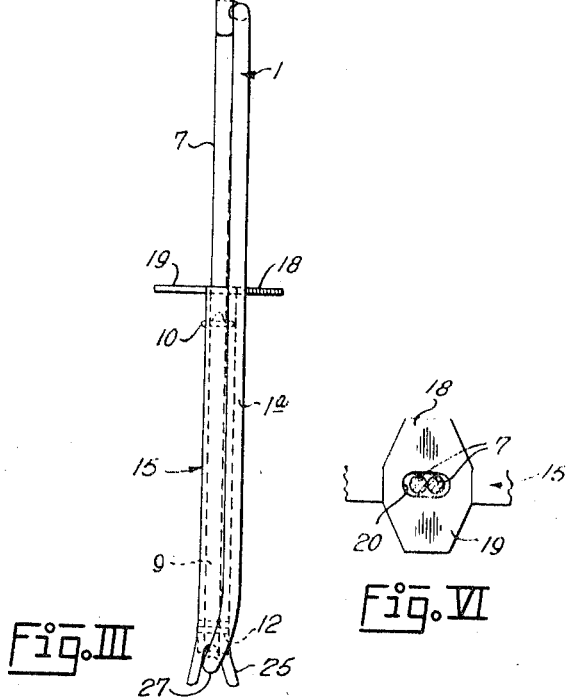
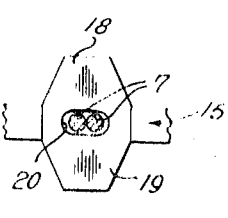
INVENTOR
Donald Paul Smith
BY Howard E. Moore
ATTORNEY

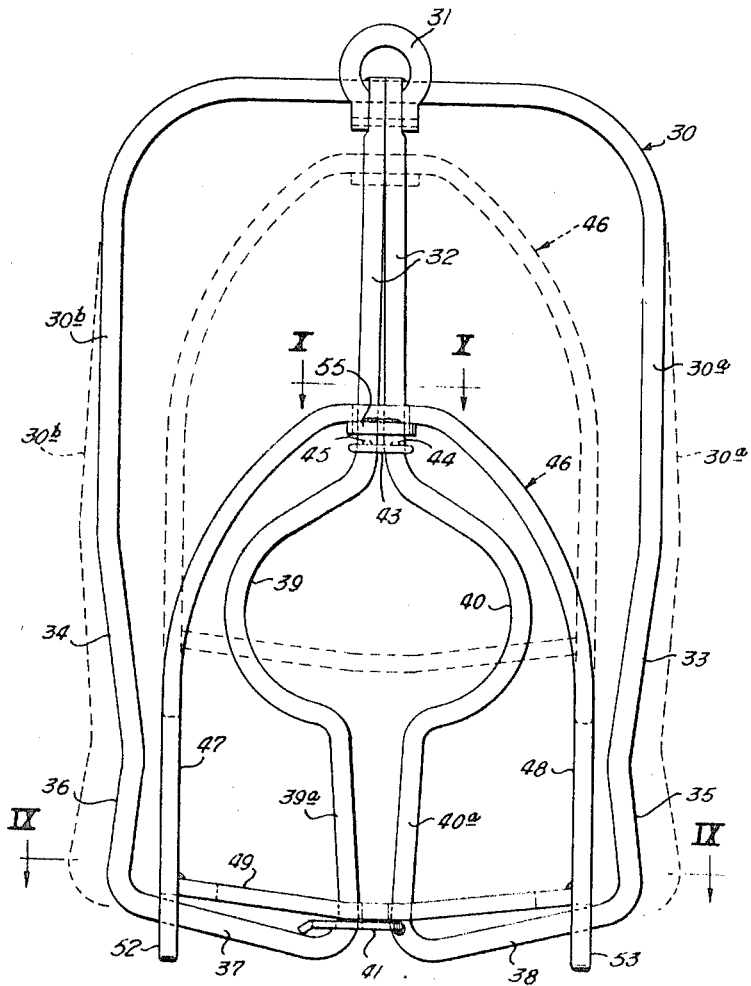
Fig. VII
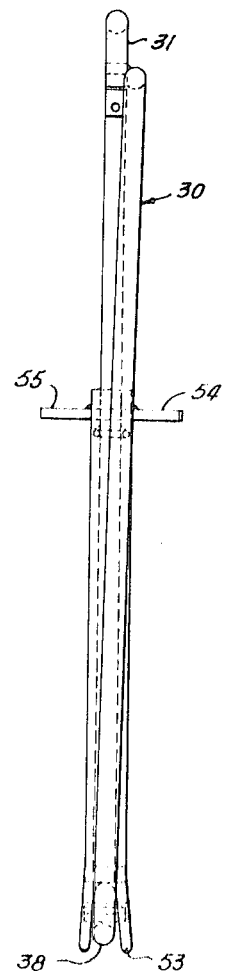
Fig. VIII
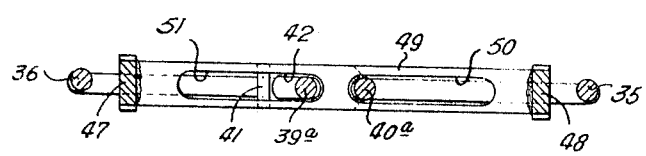
Fig. IX
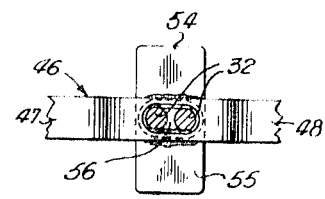
Fig. X
INVENTOR
Donald Paul Smith
BY Howard E. Moore
ATTORNEY

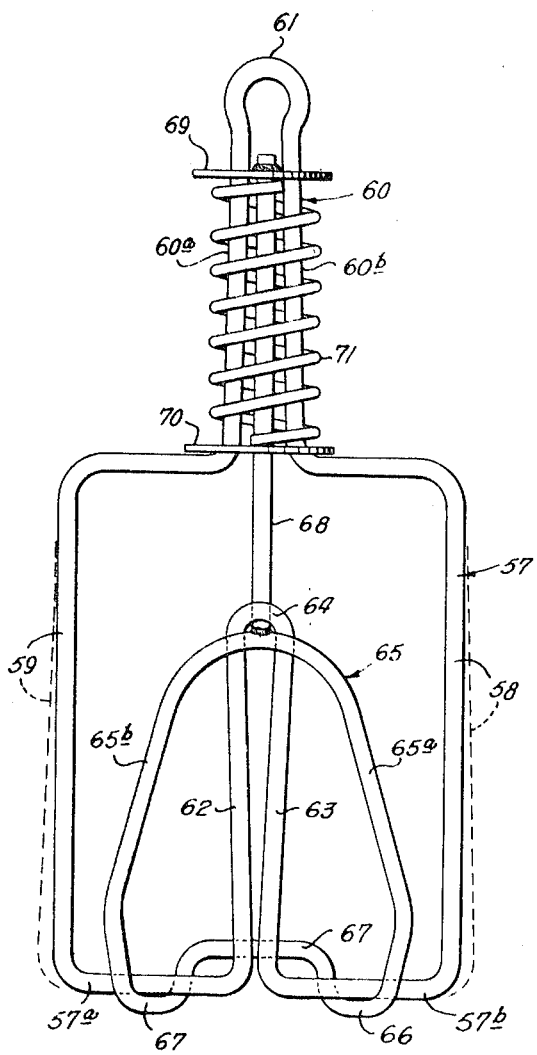
Fig. XI
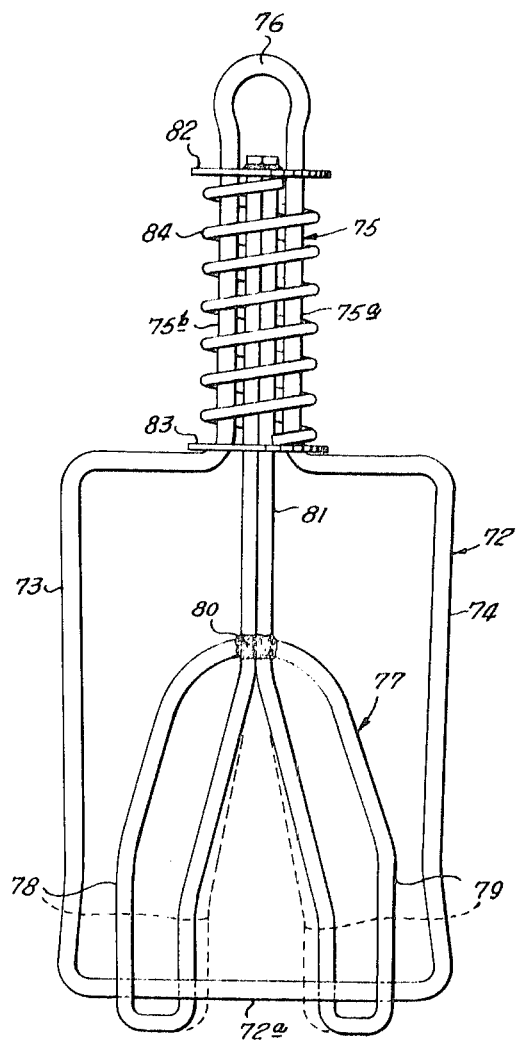
Fig. XII
INVENTOR
Donald Paul Smith
BY Howard E. Moore
ATTORNEY

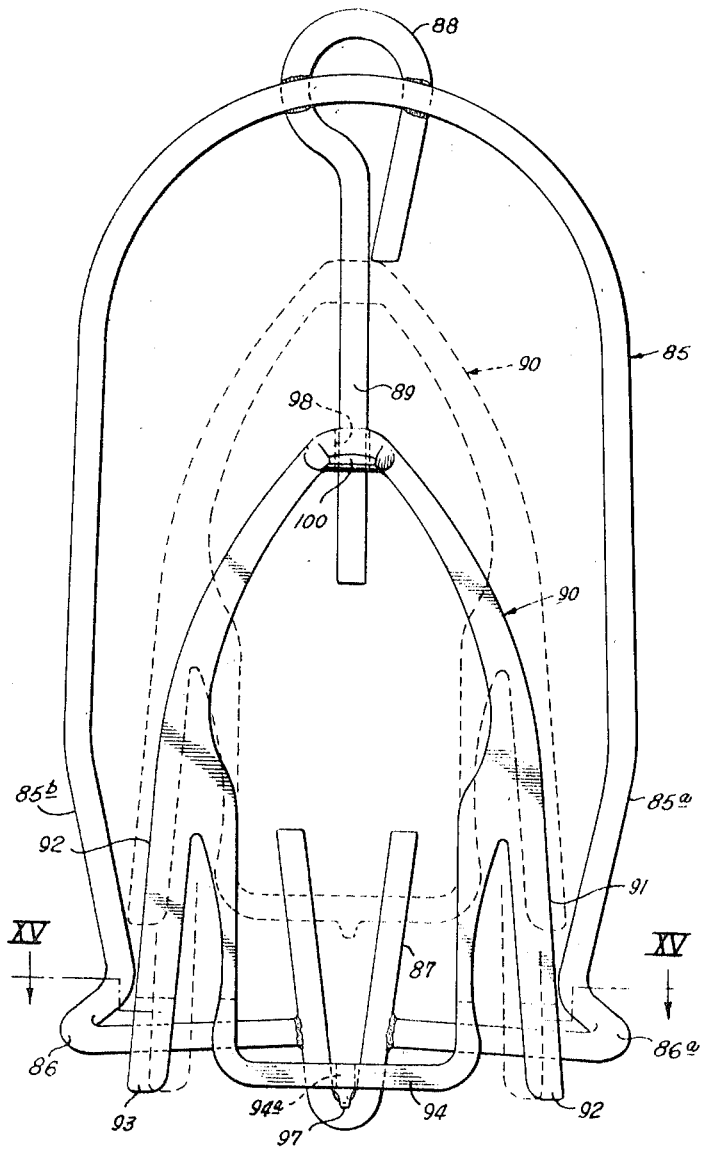
Fig. XIII
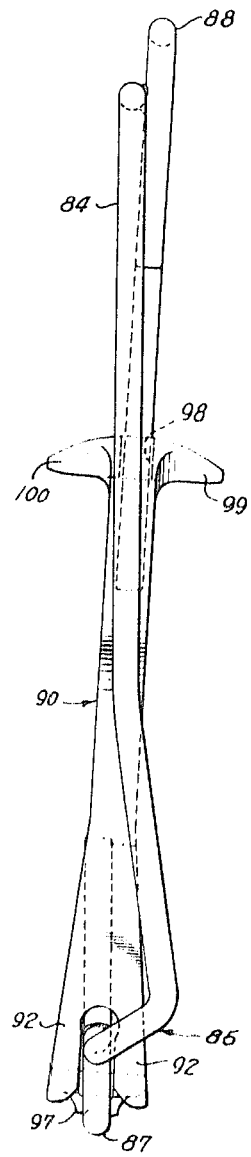
Fig. XIV
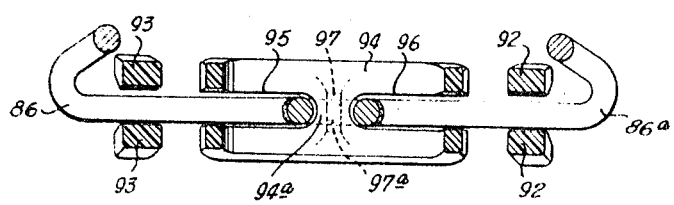
Fig. XV
INVENTOR
Donald Paul Smith
BY Howard E. Moore
ATTORNEY United States Patent Office 3,581,339
Patented June 1, 1971

3,581,339
POULTRY SHACKLE
Donald P. Smith, P.O. Box 14212, Dallas, Tex. 75234
Filed Oct. 20, 1967, Ser. No. 676,841
Int. Cl. A22b 1/00
U.S. Cl. 17—44.1                                10 Claims

ABSTRACT OF THE DISCLOSURE

A device for suspending poultry such as chickens and turkeys on a conveyor for defeathering and eviscerating same which includes a frame with a slide movably attached thereto, the sides of the frame and the slide being relatively tapered so that the legs of a fowl can be grippingly engaged therebetween for suspension in head-down position for defeathering and evisceration, but which may be relatively moved to readily release the legs of the fowl for disengagement from the suspending device.

CROSS REFERENCE TO RELATED PATENTS

The present invention is an improvement over the poultry shackles shown in my previous patents numbered 3,145,416 and 3,156,007. The devices as shown in said patent were suitable for the purposes disclosed and claimed therein, but had certain shortcomings in that they are not adjustable to automatically compensate for different sizes of poultry legs.

SUMMARY OF INVENTION

In the embodiments of the poultry shackles disclosed herein, the frame or slide is flexible to permit the leg receiving slots in the shackle to automatically adjust to accommodate and grippingly engage poultry legs of different sizes so as to make them universally adaptable for use in engaging and firmly suspending poultry of different types and sizes.

It is therefore a primary object of the invention to provide a poultry shackle wherein the frame or slide forming the slots in which the legs of the poultry are engaged are flexible so as to accommodate different sized legs of poultry suspended thereby.

A further object of the invention is to provide a poultry shackle wherein the outer frame or the inner slide may be made flexible so as to accommodate and grippingly engage poultry legs of different sizes.

Still another object of the invention is to provide a poultry shackle wherein the central slide may be pressed downwardly against a spring to release the poultry therefrom and wherein the spring automatically returns same to normal position.

Still another object of the invention is to provide an improved poultry shackle wherein the slide is guidingly engaged with the frame by the central guide member passing therethrough and having bifurcated lower ends thereon arranged to embrace the frame to hold same in stable position.

A further object of the invention is to provide in a poultry shackle a flexible outer frame arranged to be flexed laterally with reference to a rigid inner slide, with guide means to guide the slide with reference to the frame as it is moved vertically with reference thereto.

Still another object of the invention is to provide in a poultry shackle a rigid outer frame and a flexible slide guidingly attached to the frame so as to conform to poultry legs of different sizes.

A further object of the invention is to provide in a poultry shackle a rigid outer frame and a central slide movably engaged to the frame, said slide having flexible legs thereon arranged to grippingly engage the legs of the fowl between the sides of the frame, and wherein the legs are guidingly engaged to the frame to maintain same in proper alignment with the frame.

Other and further objects of the invention will become apparent upon reading the detailed specification hereinafter following and by referring to the drawings annexed hereto.

BRIEF DESCRIPTION OF THE DRAWINGS

Suitable embodiments of the invention are shown in the attached drawings wherein, FIG. I is a perspective view of one form of poultry shackle wherein the outer legs of the frame are flexible and the slide is rigid;

FIG. II is a front elevational view of the poultry shackle shown in FIG. I;

FIG. III is a side elevational view thereof;

FIG. IV is a transverse sectional view taken along the line IV—IV of FIG. II;

FIG. V is a transverse sectional view taken along the line V—V of FIG. II;

FIG. VI is a transverse sectional view taken along the line VI—VI of FIG. II;

FIG. VII is a front elevational view of another form of poultry shackle wherein the side legs of the frame are flexible;

FIG. VIII is a side elevational view of the poultry shackle shown in FIG. VII;

FIG. IX is a transverse sectional view taken along the line IX—IX of FIG. VII;

FIG. X is a transverse sectional view taken along the line X—X of FIG. VII;

FIG. XI is a front elevational view of still another form of poultry shackle incorporating the invention disclosed and claimed herein wherein the side legs of the frame are flexible, and wherein the slide is urged upwardly by a spring so that it can be released by pressing downward thereupon against the spring;

FIG. XII is still another form of poultry shackle wherein the central slide has flexible legs and the frame is rigid and wherein the slide is urged upwardly by a spring so that it may be pressed downwardly against the spring to release the poultry from the shackle;

FIG. XIII is a front elevational view of a still further embodiment of the invention, showing a rigid frame and a slide made of flexible plastic material having flexible legs thereon which are guidingly engaged to the rigid frame;

FIG. XIV is a side elevational view of the form of poultry shackle shown in FIG. XIII;

FIG. XV is a transverse sectional view taken along the line XV—XV of FIG. XIII.

DESCRIPTION OF PREFERRED EMBODIMENTS

Numeral references are employed to indicate the various parts shown in the drawings and like numerals indicate like parts throughout the various figures of the drawings.

Referring first to the form shown in FIGS. I–VI, the numeral 1 indicates a frame which, as shown, is made of metallic rod stock having a suspending loop 2 welded or otherwise securely attached centrally of the upper end thereof. The frame may be suspended to an overhead conveyor or other supporting device by means of a link 3, having a hook 4 on the lower end thereof engaged with the loop 2 and a hook 5 on the other end thereof engaged with a hook on the lower end of a suspension rod 6 which may in turn be attached to a conveyor or other overhead suspending structure.

The frame 1 includes parallel side members 1a and 1b and a central guide and support member 7 which is formed by two side by side rod members welded at their upper ends centrally of the upper end of the frame, and being bowed outwardly to provide spaced legs 8 and 9 which are integral with the frame sides 1a and 1b and the lower horizontal portions 26 and 27 thereof.

A rigid restraining band 10 is extended about the upper ends of the legs 8 and 9 and is abutted against stop plugs 11 extending outwardly of the upper ends of said legs.

The rod material from which the frame 1 is made is slightly flexible so that the legs 8 and 9 and the side members 1a and 1b may be flexed outwardly as shown in broken lines in FIG. II.

A guide 12 has one end welded, as indicated at 13, to the leg 8 and the other end thereof is free. The guide 12 has an elongated passage 14 therethrough through which the leg 9 extends and is movable laterally therein to permit the legs 8 and 9 to flex outwardly and inwardly with relationship thereto, but being held in parallel position by the slot 14 in the guide member 12.

A slide, generally indicated at 15, has rigid arcuate legs 16 and 17, said legs being secured and fixed in parallel relationship by a cross brace 21 secured therebetween as by welding.

Lifting tabs 18 and 19 are made integral with, and extend outwardly of, the mid portion of the upper end of the slide 15. A passage 20 is provided through the upper end of slide 15 through which slidably extends the central guide member 7, the slide 15 being movable upwardly on the central guide member 7, as indicated by broken lines in FIG. II.

The lifting tabs 18 and 19 may be grasped for lifting the slide 15 upwardly as the passage 20 slides along the guide 7.

A pair of evenly spaced elongated passages 22 and 23 are provided through the cross brace 21 and the legs 8 and 9 extend through said passages. In normal relaxed position the legs 8 and 9 are disposed at the inner ends of said passages but upon flexure outwardly the legs 8 and 9 may move outwardly in said passages to the extent of the length thereof.

Forked ends 24 and 25 are provided on the lower ends of the side members 16 and 17 of frame 15 and extend below the cross brace 21 and embrace the horizontal portions 26 and 27 of the frame 1 to provide guides and supports for the slide 15 when in lower position.

The frame 1 is formed to provide offset portions 28 and 29 thereby causing the horizontal portions 26 and 27 to be offset with relation to the side portions 1a and 1b. This permits a more secure wedging action between the slide and the side members of the frame as the slide is brought downwardly to expand the legs 8 and 9 outwardly.

The operation and function of the embodiment hereinbefore described is as follows:

When it is desired to suspend a fowl to the shackle, the legs are inserted through the frame on each side of the guide 7 and are pushed downwardly between the legs 16 and 17 of the slide 15 and the outer side members 1a and 1b by exerting downward pressure upon the legs of the fowl. The legs 8 and 9 of the frame 1 and the side members 1a and 1b are caused to spring outwardly to permit the legs of the fowl to move further downwardly in the slots provided between the slide and the sides of the frame member to thereby wedge the legs of the fowl therebetween. By reason of the flexibility of the frame member, the slots provided between the frame and the slide may be enlarged to accommodate different sizes of fowl legs, yet provides a firm gripping engagement with the legs of the fowl irrespective of the size thereof.

When it is desired to release the fowl from the shackle the tabs 18 and 19 may be grasped to move the slide 15 upwardly on the guide 7 to thereby move the legs upwardly to an enlarged area between the slide and the frame member to permit the legs of the fowl to be disengaged from the shackle.

Another embodiment of invention is disclosed in FIGS. VII–X wherein a frame 30 is formed of flexible metallic rod material and includes side members 30a and 30b. A suspending loop 31 is secured centrally on the upper end of the frame by which the shackle may be suspended to a conveyor or other supporting device as was described in connection with the form previously described.

As in the previous embodiment, the frame 30 is made of a continuous rod material and shaped to provide a central guide member 32 which is formed by the side by side ends of the rod material from which the frame is formed, and is secured as by welding centrally of the upper end of the frame 30. The outer sides 30a and 30b of the frame are shaped to provide inwardly angled portions 33 and 34 which are outwardly angled as indicated at 35 and 36 and are returned inwardly to provide lower inwardly extending portions 37 and 38. The frame member is further provided with spaced vertically extending legs 39a and 40a and has bowed-out portions 39 and 40 which are terminated at their upper ends by the guide portion 32.

The guide portions 32 are restrained and held in upward position by a rigid restraining ring 43 secured thereabout. Restraining ring 43 is secured against upward movement by abatement with stop lugs 44 and 45 extending outwardly of the frame member.

A guide member 41 is secured at its inner end to the leg 40a, is free at its outer end, and has an elongated passage 42 therein through which freely extends the leg 39a. The elongated slot 42 permits the legs 39a and 40a to move inwardly and outwardly with relation thereto so as to permit flexure of said legs for engagement with the legs of a fowl in the manner hereinafter described.

A slide, generally indicated at 46 has side legs 47 and 48 which are secured together by means of a transverse cross brace 49 which is welded at each end to the respective sides 47 and 48. The cross brace 49 has elongated slots 50 and 51 provided therethrough through which the legs 39a and 40a extend, and in normal relaxed position are disposed at the inner ends of said slots, as indicated at FIG. IX. The slots 50 and 51 provide guide slots to permit the legs 39a and 40a to flex outwardly when the legs of the fowl are inserted in the slots provided between the slide and the side legs of the frame.

The sides 47 and 48 of the slide 46 extend downwardly beyond the cross brace 49 and terminate in forks 52 and 53 which straddle the lower portions 37 and 38 of the frame when the slide 46 is in downward position, as shown in FIG. VII.

Lifting tabs 54 and 55 are secured centrally of the upper end of the slide 46. An elongated passage 56 is provided through the upper end of the slide 46 through which the center suspension member 32 is slideably disposed. The lifting tabs 54 and 55 may be grasped to move the slide 46 upwardly about the suspension member 32 to release the poultry legs from the shackle in the manner hereinafter described. The slide 46 is shown in upward position in broken lines in FIG. VII.

The operation and function of the form of the device shown in FIGS. VII–X is as follows:

When it is desired to suspend a fowl from the shackle, the legs of the fowl are inserted in the slots provided between the legs 47 and 48 of the slide and the legs 30a and 30b of the frame. The legs are guided into said slots along the tapered surfaces provided on each side of the upper end of the slide and on the tapered portions 33 and 34 of the frame. As the legs of the fowl are forced into said slots the legs 39a and 40a and side leg 30a and 30b are flexed outwardly as indicated in broken lines thereby accommodating the slots between the slide and the side members of the frame to the particular size of the fowl's legs, and at the same time grippingly engaging the fowl's legs between the frame and the slide.

When it is desired to release the fowl from the shackle, the tabs 54 and 55 may be grasped and the slide moved upwardly, as indicated by broken lines in FIG. VII, thereby moving the fowl's legs upwardly to enlarged slots between the slide and the side members of the frame so that the legs of the fowl will be released therefrom. Upon such action the legs 39a and 40a and side legs 30a and 30b of the frame will flex back to normal position as shown in full lines in FIG. VII.

A still further embodiment of the invention is shown in FIG. XI wherein the frame 57, made of flexible metallic rod material, has side legs 58 and 59 and is formed to provide lower horizontal portions 57a and 57b which are deflected upwardly to provide legs 62 and 63 joined at their upper ends by a continuous loop 64.

The frame 57 is formed at the upper end to provide an upper extension 60 provided by spaced rod portions of the frame 60a and 60b.

The slide 65 is preferably made of metallic rod material, and is formed to provide outwardly tapered side legs 65a and 65b which are extended about the horizontal base portions 57a and 57b of the frame and is terminated by the horizontal guide portion 67, providing a slot in which the frame portions 57 and 57a are slideably engaged.

An operating rod 68 is welded or otherwise securely attached centrally of the upper end of the slide 65 and freely extends through the loop 64 and upwardly between the side members 60a and 60b of the upper extension 60 of the frame.

An upper plate 69 is welded or otherwise securely attached to the upper end of the operatin rod 68 and a plate 70 is secured about the lower end of the suspension member 60 of the frame.

A compression spring 71 is disposed about the suspension member 60 and confined between the plates 69 and 70.

It will be noted that the outer sides 58 and 59 of the frame and the legs 62 and 63 are flexible as related to the slide 65, so that when the legs of a fowl are inserted in the slots provided between the sides of the frame and the sides of the slide, the legs 62 and 63 and side members 58 and 59 may flex outwardly to accommodate the slots to the varying sizes of the legs of fowls and to securely grip same.

When it is desired to release the fowl from the shackle shown in FIG. XI, the spring 71 may be contracted by pressing upon the plate 69, thereby moving the rod 68 downwardly and moving the slide 65 downwardly, thereby releasing the legs of the fowl as they move into the enlarged slot area provided by the tapered surfaces 65a and 65b.

Another form of the device is shown in FIG. XII wherein the frame 72 is made of metallic rod material which includes side portions 73 and 74 and a horizontal base portion 72a. The side members are slightly tapered inwardly and then tapered outwardly at the lower ends. The frame member is continued upwardly to form a suspension neck 75 formed by spaced parallel portions of the frame member, indicated at 75a and 75b, said members terminating at their ends by a suspension loop 76 which may be attached to a conveyor or other suspension device.

A slide 77 is made of metallic rod material and is formed to provide spaced loops 78 and 79 which comprise flexible legs secured as by welding 80 to the operating member 81. The operating member 81 is comprised of side by side rod portions of the slide 77.

A plate 82 is secured as by welding to the upper end of the operating member 81, and a plate 83 is secured about the lower end of the suspension member 75. The operating member 81 slideably extends through the plate 83.

A spring 84 is loosely disposed about the suspension neck 75 and is confined between the plates 82 and 83.

It will be seen that when the legs of a fowl are inserted in the slots provided between the sides of the slide and the sides of the frame and lowered along the tapered surfaces provided by the sides of the slide, the legs 78 and 79 may flex inwardly to accommodate the size of the legs of the fowl and grippingly engage same.

When it is desired to release the fowl from the slide, the plate 82 may be pressed downwardly contracting the spring 84, thereby moving the slide 77 downwardly, releasing the legs of the fowl from engagement in the slots between the slide and the frame.

Still another embodiment of the invention is shown in FIGS. XIII–XV wherein the frame is generally indicated at 85, said frame being made up of metallic rod material which is curved inwardly as indicated at 85a and 85b, is deflected outwardly as indicated at 86 and 86a and the ends thereof are welded or otherwise securely attached to a substantially V-shaped guide slot 87.

A suspension loop 88 is secured to the upper end of the frame 85 and includes a downwardly extending guide rod portion 89.

The slide 90 is made of flexible material and is formed to provide flexible legs 91 thereon having pronged ends 92 and 93 thereon which are arranged to embrace the horizontal base portions of the frame when the slide 90 is in downward position as shown in full lines in FIG. XIII.

The slide 90 includes a downwardly extending portion 94 which has elongated slots 95 and 96 therethrough separated by a closed portion 94a from which there extends downwardly a portion 97 having a slot 97a therein arranged to embrace the lower end of the guide member 87 when the slide 90 is in downward position.

A passage 98 is provided centrally through the upper portion of the slide 90 which slideably encompasses the guide rod 89 so that the slide 90 may move upwardly and downwardly with relation to the guide rod 89 and is supported against lateral movement with reference thereto.

A pair of grasping tabs 99 and 100 extend outwardly from the upper end of the slide 90 which may be engaged for the purpose of moving the slide 90 upwardly along the guide rod 89.

The operation of the device disclosed in FIGS. XIII–XV is as follows:

The legs of the fowl may be inserted between the sides of the frame and the flexible legs 91 and 92 of the slide 90. The legs of the fowl are guided downwardly by the sloping surfaces of the sides of the slide 90 and are grippingly engaged in the slots provided between the legs of the slide and the sides of the frame. The slide is guided in its downward movement by engagement of the slots 95 and 96 about the lower end of the frame and the guide member 87.

When it is desired to release the fowl from the shackle shown in FIGS. XIII–XV, the tabs 99 and 100 may be grasped and the slide 90 may be moved upwardly as the passage 98 slides along the guide rod 89.

It will therefore be seen that I have provided a device for suspending poultry for the purpose of defeathering and eviscerating same wherein either the frame or the slide therefor is made of flexible material so as to permit the device to adjust to different sizes of fowl's legs, yet provides for a firm and positive gripping engagement therewith, which is easy and simple to engage the legs of the fowl therewith and to release the same therefrom.

It will be understood that other and further embodiments of the invention may be devised without departing from the spirit and scope of the appended claims.

Having described my invention, I claim:

1. In a device of the class described, a frame comprising a substantially continuous rod-like member formed to provide spaced sides on the frame; a rigid central guide member on the frame between the spaced sides; a slide member having an aperture formed therein, said guide member extending through said aperture in the slide and said slide being slidable vertically on said guide member on said frame; side members on the slide spaced from the sides of the frame, providing tapered slots between the sides of the frame and the sides of the slide which are arranged to receive and grip the legs of a fowl therein; and downwardly opening forked ends on the lower ends of the sides of the slide arranged to straddle a portion of the frame;

wherein the side members on the slide or the sides of the frame are flexible relative to each other such that the legs of a fowl are gripped in the tapered slots without vertical movement of the slide.

2. The combination called for in claim 1 wherein the sides of the slide are flexible.

3. The combination called for in claim 1 with the addition of means between a lower portion of the slide and the frame to maintain the sides of the slide and the sides of the frame in a predetermined vertical relationship.

4. The combination called for in claim 1 with the addition of means connected between sides of the slide having at least one passage formed therein through which a portion of the guide member is movable to maintain predetermined lateral relationship between the slide and the frame.

5. The combination called for in claim 1 wherein the slide is comprised of a continuous piece of rod material.

6. The combination called for in claim 1 wherein the slide is made of flexible plastic material and the legs are integral extension of the plastic material.

7. The combination called for in claim 1 with the addition of a suspending member secured to the upper end of the frame which is substantially centrally thereof.

8. A poultry shackle comprising, a first frame having spaced resilient sides constructed of a substantially continuous rod member; a central guide member formed of side by side end sections of the rod member; means to secure ends of the rod member to the frame; restraining means securing a central portion of said guide member intermediate upper and lower ends of the sides of the frame to prevent flexing of upper portions of the guide member, lower portions of the guide member being bowed outwardly to provide spaced legs which are integral with sides of the frame; a second frame having spaced sides; means to slidably secure the first and second frames together to form tapered slots between sides of the first and second frames, the second frame being movable along the said guide member.

9. In a poultry shackle a frame comprising a substantially continuous rod like member formed to provide spaced sides and a central guide member, said guide member having spaced resilient leg members extending downwardly therefrom and integral with the spaced sides of the frame; restraining means to secure portions of the rod member together to form the guide member and the spaced resilient legs; means to secure ends of the rod like member to a central portion thereof; a slide having an aperture formed therein through which the guide member extends; sides on the slide spaced from sides of the frame forming slots therebetween, said slide being movable along said guide member to release legs of a fowl gripped in said slots.

10. In a poultry shackle, a frame; spaced sides on the frame; a central guide member secured to an upper portion of said frame and extending downwardly therefrom, said guide member being horizontally spaced from and positioned between the sides of the frame; a slide having a central opening formed therein, said guide member on the frame extending through the central opening in the slide; spaced sides on the slide spaced from the sides of the frame forming slots therebetween; and lifting means on the slide adapted to transfer force to move the slide upwardly along the guide member to release legs of a fowl from the slot between sides of the slide and sides of the frame.

References Cited
UNITED STATES PATENTS

| 3,376,600 | 4/1968 | Shadley | 17—44.1 |
| 2,797,436 | 7/1957 | Shadley | 17—44.1 |
| 3,289,245 | 12/1966 | Van Dolah et al. | 17—44.1 |

FOREIGN PATENTS

| 1,357,704 | 3/1964 | France | 17—44.1 |

LUCIE H. LAUDENSLAGER, Primary Examiner